8188X
Slater & Noblit.
Metallic Burrs.
Patented May 12, 1834.
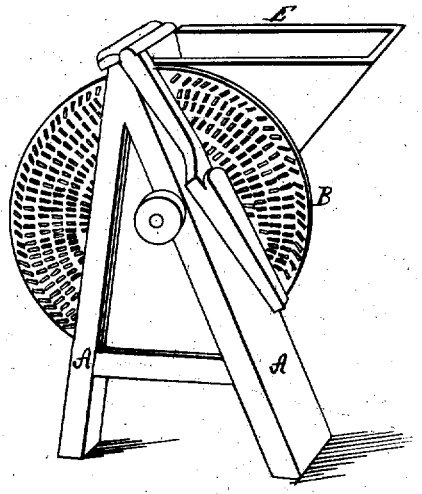
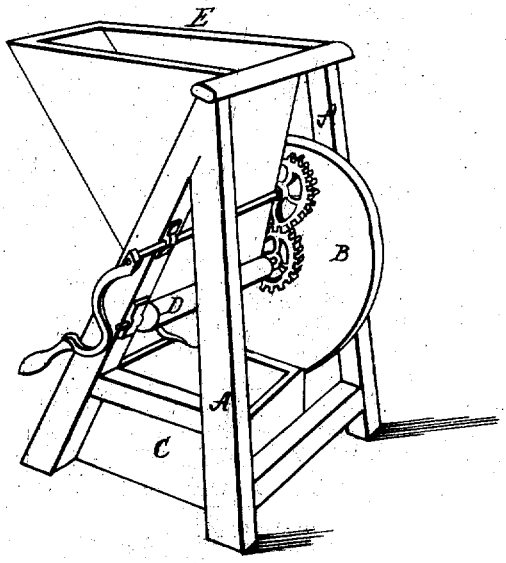

8188x May 12. 1834

Samuel Slater & Stephens Noblit
8188x
Letters Patent

The Schedule referred to in these Letters Patent and making part of the same containing a description in the words of the said Samuel Slater and Stephens Noblit themselves of their Improvement in the machine for shelling & grinding corn

---

To all to whom these presents shall come. Be it known that we Samuel Slater of the City of Philadelphia commission Merchant & Machinist & Stephens Noblit of the same place machinist have invented or discovered a new & useful improvement in the machines for shelling & grinding corn (being a sheller & grinder) so constructed that both operations may be performed with the same machine. And that the following is a full & exact description of the same as invented or improved by us, to wit, The improvement consists in constructing the corn sheller & grinder in such manner that they will form but one machine so that corn may be shelled & ground by it at the same time & so that it may be used for shelling at one time & for grinding at another if required. The frame may be made in the form of the frame of a common corn sheller or in any other manner that may be more desirable. The part constituting the sheller may be made on any of the plans now in use in which the axis of the sheller is placed horizontally. The end or side of the frame at which the corn is shelled may be boarded up (if prefered) to prevent the corn from flying off & to cause it to fall in one place on the floor or into a box prepared to receive it. The part constituting the grinder or mill is made on the plan of the cylinder mills which grind on the periphery of an iron or stone cylinder. The cylinder or revolving grinder (made of iron steel or stones) is fixed on the axis of the sheller that being made of sufficient length for that purpose. An iron steel or stone concave is fixed by the side of said cylinder in the usual manner. The concave is secured to the frame in such manner that it may be moved toward or from the said cylinder by a screw or other fixture to regulate the feeding & grinding. There is a hop 8188x May 12, 1834 per of the common construction placed over the grinder & a box fixed un
der it to receive the corn or other substance when ground. It may be
used for grinding corn or other grain for feed or other purposes. & it may
used to shell & grind at the same time or to shell at one time & to grind
at another time. The machine may be propelled by manual or by
any other power. the fixtures by which the power is to be communicat
ed being such as may be necessary for the kind of power to be applied.
The object intended to be attained by the improvement is not to
make the sheller or grinder more perfect than when they are made
separate but to make them less expensive & less cumbersome than
when made in two distinct machines & so that both can be used
at the same time with the same power if required. The part claim
ed as an invention or discovery is the union of the corn sheller & grinder
in one machine as above mentioned Witnesses
Davis B. Lee
Michael Ash Samuel Slater
Stephen Noblet 630 w (Patented 12th May 1834
Drawing made from Specification)